United States Patent
Li et al.

(10) Patent No.: US 11,323,227 B2
(45) Date of Patent: May 3, 2022

(54) MULTIPLEXING OF PHYSICAL UPLINK SHARED CHANNEL (PUSCH) AND PHYSICAL UPLINK CONTROL CHANNEL (PUCCH) IN UPLINK SHORT BURST TRANSMISSION

(71) Applicant: QUALCOMM Incorporated, San Diego, CA (US)

(72) Inventors: Chih-Ping Li, San Diego, CA (US); Jing Jiang, San Diego, CA (US); Yi Huang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 16/192,678

(22) Filed: Nov. 15, 2018

(65) Prior Publication Data

US 2019/0158252 A1 May 23, 2019

Related U.S. Application Data

(60) Provisional application No. 62/588,291, filed on Nov. 17, 2017.

(51) Int. Cl.
*H04W 4/00* (2018.01)
*H04L 5/00* (2006.01)
(Continued)

(52) U.S. Cl.
CPC .......... *H04L 5/0055* (2013.01); *H04L 1/1664* (2013.01); *H04L 1/1671* (2013.01);
(Continued)

(58) Field of Classification Search
CPC combination set(s) only.
See application file for complete search history.

(56) References Cited

U.S. PATENT DOCUMENTS 9,814,058 B2 11/2017 Jiang et al.
9,936,469 B2 4/2018 Ji et al.
(Continued)

OTHER PUBLICATIONS

CATT: "Multiplexing of UCI and UL Data", 3GPP Draft; R1-1707507, 3rd Generation Partnership Project (3GPP), Mobile Competence Centre; 650, Route Des Lucioles; F-06921 Sophia-Antipolis Cedex; France, vol. RAN WG1, No. Hangzhou; May 15, 2015-May 19, 2017 May 14, 2017 (May 14, 2017), XP051272715, Retrieved from the Internet: URL:http://www.3gpp.org/ftp/Meetings_3GPP_SYNC/RAN1/Docs/ [retrieved on May 14, 2017], 4 pages.
(Continued)

*Primary Examiner* — Atique Ahmed
(74) *Attorney, Agent, or Firm* — Quarles & Brady LLP

(57) ABSTRACT

Aspects of the disclosure relate to an apparatus and method for wireless communication. The apparatus receives downlink control information (DCI) or a radio resource control (RRC) message indicating a configuration of an uplink burst region of a downlink-centric slot, the configuration allocating resources within the uplink burst region between a physical uplink shared channel (PUSCH) and a physical uplink control channel (PUCCH) or uplink control information (UCI). The PUSCH is multiplexed with at least one of the PUCCH or the UCI in the uplink burst region. The apparatus further generates a feedback signal (e.g., Transmission Control Protocol (TCP) acknowledgement (ACK)) corresponding to a downlink (e.g., TCP) data packet received from a scheduling entity and transmits the feedback signal to the scheduling entity via the PUSCH configured in the uplink burst region of the downlink-centric slot. Other aspects, embodiments, and features are also claimed and described.

33 Claims, 14 Drawing Sheets

(51) Int. Cl.
  *H04L 1/18*   (2006.01)
  *H04L 1/16*   (2006.01)
  *H04L 5/14*   (2006.01)
  *H04W 76/27*  (2018.01)
  *H04L 27/26*  (2006.01)
  *H04W 72/04*  (2009.01)
  *H04W 72/14*  (2009.01)

(52) U.S. Cl.
  CPC .......... *H04L 1/1861* (2013.01); *H04L 5/0053* (2013.01); *H04L 5/1469* (2013.01); *H04L 27/2605* (2013.01); *H04L 27/2662* (2013.01); *H04W 72/0406* (2013.01); *H04W 76/27* (2018.02); *H04W 72/14* (2013.01)

(56) References Cited

U.S. PATENT DOCUMENTS

| | | | |
|---|---|---|---|
| 9,936,519 B2 | 4/2018 | Mukkavilli et al. | |
| 10,075,970 B2 | 9/2018 | Jiang et al. | |
| 10,342,012 B2 | 7/2019 | Mukkavilli et al. | |
| 2007/0140165 A1* | 6/2007 | Kim | H04W 72/1268 370/329 |
| 2010/0290415 A1* | 11/2010 | Han | H04L 1/1854 370/329 |
| 2013/0195065 A1* | 8/2013 | Park | H04L 5/0055 370/329 |
| 2014/0036748 A1* | 2/2014 | Mukherjee | H04W 52/0212 370/311 |
| 2014/0211739 A1* | 7/2014 | Kim | H04L 5/0037 370/329 |
| 2014/0369242 A1* | 12/2014 | Ng | H04L 5/001 370/280 |
| 2017/0331577 A1* | 11/2017 | Parkvall | H04W 8/18 |
| 2017/0367046 A1* | 12/2017 | Papasakellariou | H04W 72/0453 |
| 2018/0019843 A1* | 1/2018 | Papasakellariou | H04L 5/0048 |
| 2018/0132229 A1* | 5/2018 | Li | H04W 72/1268 |
| 2018/0132264 A1* | 5/2018 | Jung | H04L 1/1854 |
| 2018/0288787 A1* | 10/2018 | Hooli | H04W 74/0808 |
| 2018/0332577 A1* | 11/2018 | Yang | H04L 5/0055 |
| 2019/0007867 A1* | 1/2019 | Hu | H04L 29/10 |

OTHER PUBLICATIONS

International Search Report and Written Opinion—PCT/US2018/061610—ISA/EPO—dated May 13, 2019.
Qualcomm Incorporated: "Power Control and PHR for NR", 3GPP Draft; R1-1718592 Power Control and PHR for NR, 3rd Generation Partnership Project (3GPP), Mobile Competence Centre; 650, Route Des Lucioles F-06921 Sophia-Antipolis Cedex; France, vol. RAN WG1, No. Prague, CZ; Oct. 9, 2017-Oct. 13, 2017 Oct. 8, 2017 (Oct. 8, 2017), XP051341768, Retrieved from the Internet: URL:http://www.3gpp.org/ftp/Meetings_3GPP_SYNC/RAN1/Docs/ [retrieved on Oct. 8, 2017], 6 pages, Sections 1, 4.
Qualcomm Incorporated: "UCI Content", 3GPP Draft; R1-1612072, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 13, 2016 (Nov. 13, 2016), XP051176032, pp. 1-3, Retrieved from the Internet: URL:http://www.3gpp.org/ftp/Meetings_3GPP_SYNC/RAN1/Docs/ [retrieved on Nov. 13, 2016].
Qualcomm Incorporated: "UL Data Transmission Procedures", 3GPP Draft; R1-1720690 UL Data Transmission Procedures, 3rd Generation Partnership Project (3GPP), Mobile Competence Centre; 650, Route Des Lucioles; F-06921 Sophia-Antipolis Cedex; France, vol. RAN WG1, No. Reno, USA; Nov 27, 2017-Dec. 1, 2017 Nov. 18, 2017, XP051370151, Retrieved from the Internet: URL:http://www.3gpp.org/ftp/tsg%5Fran/WG1%5FRL1/TSGR1%5F91/Docs/ [retrieved on Nov. 18, 2017], 6 pages.
Levanen T., et al., "Dense Small-Cell Networks: Rethinking the Radio Interface Beyond LTE-Advanced", 2014 1st International Conference on 5G for Ubiquitous Connectivity, ICST, Feb. 12, 2015, pp. 163-169, XP032735039, DOI: 10.4108/ICST.5GU.2014.258115 [retrieved on Feb. 11, 2015].

* cited by examiner

MULTIPLEXING OF PHYSICAL UPLINK SHARED CHANNEL (PUSCH) AND PHYSICAL UPLINK CONTROL CHANNEL (PUCCH) IN UPLINK SHORT BURST TRANSMISSION

PRIORITY CLAIM

This application claims priority to and the benefit of U.S. Provisional Application Ser. No. 62/588,291, entitled "MULTIPLEXING OF PHYSICAL UPLINK SHARED CHANNEL (PUSCH) AND PHYSICAL UPLINK CONTROL CHANNEL (PUCCH) IN UPLINK SHORT BURST TRANSMISSION" filed on Nov. 17, 2017, the entire contents of which is incorporated herein by reference as if fully set forth below and for all applicable purposes.

TECHNICAL FIELD

The technology discussed below relates generally to wireless communication systems, and more particularly, to communication devices, methods, and systems employing a physical channel structure for uplink transmissions that carry a transport layer acknowledgment. Embodiments can provide and enable techniques for multiplexing a physical uplink shared channel (PUSCH) and a physical uplink control channel (PUCCH) in an uplink short burst transmission.

INTRODUCTION

Wireless communication systems have been adopted in various telecommunication standards to provide a common protocol that enables different wireless devices to communicate on a municipal, national, regional, and even global level. For example, fifth generation (5G) New Radio (NR) communications technology is envisaged to expand and support diverse usage scenarios and applications with respect to current mobile network technologies. 5G communications technology can include, for example, enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information.

A variety of data services may be provided within wireless networks, including voice, video, and emails. More recently, wireless communication networks are being utilized for an even broader range of services, including mission critical applications and remote-control applications such as tele-surgery, where real-time feedback is necessary. In such applications, very low latency is critical to enable a suitably high quality of service. That is, the time for information to be transmitted from a communication device, and a response received back at the communication device, may need to be extremely rapid, on the order of milliseconds.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method for wireless communication (e.g., at a scheduled entity) is disclosed. Methods can practiced by a variety of devices such as a scheduled entity. The method includes receiving downlink control information (DCI) or a radio resource control (RRC) message indicating a configuration of an uplink burst region of a downlink-centric slot, the configuration allocating resources within the uplink burst region between a physical uplink shared channel (PUSCH) and a physical uplink control channel (PUCCH) or uplink control information (UCI). The method further includes generating a feedback signal (e.g., Transmission Control Protocol (TCP) acknowledgement (ACK)) corresponding to a downlink data packet (e.g., TCP data packet) received from a scheduling entity and transmitting the feedback signal to the scheduling entity via the PUSCH configured in the uplink burst region of the downlink-centric slot. The method also includes receiving the TCP data packet from the scheduling entity.

In another example, a scheduled entity for wireless communication is disclosed. The scheduled entity includes means for receiving downlink control information (DCI) or a radio resource control (RRC) message indicating a configuration of an uplink burst region of a downlink-centric slot, the configuration allocating resources within the uplink burst region between a physical uplink shared channel (PUSCH) and a physical uplink control channel (PUCCH) or uplink control information (UCI). The scheduled entity further includes means for generating a feedback signal (e.g., Transmission Control Protocol (TCP) acknowledgement (ACK)) corresponding to a downlink data packet (e.g., TCP data packet) received from a scheduling entity and means for transmitting the feedback signal to the scheduling entity via the PUSCH configured in the uplink burst region of the downlink-centric slot. The scheduled entity also includes means for receiving the TCP data packet from the scheduling entity.

In a further example, a computer-readable medium storing computer-executable code for wireless communication is disclosed, which includes code for causing a computer to receive downlink control information (DCI) or a radio resource control (RRC) message indicating a configuration of an uplink burst region of a downlink-centric slot, the configuration allocating resources within the uplink burst region between a physical uplink shared channel (PUSCH) and a physical uplink control channel (PUCCH) or uplink control information (UCI). The code further causes the computer to generate a feedback signal (e.g., Transmission Control Protocol (TCP) acknowledgement (ACK)) corresponding to a downlink data packet (e.g., TCP data packet) received from a scheduling entity and transmit the feedback signal to the scheduling entity via the PUSCH configured in the uplink burst region of the downlink-centric slot. The code also causes the computer to receive the TCP data packet from the scheduling entity.

In another example, a scheduled entity for wireless communication is disclosed. The scheduled entity includes at least one processor, a transceiver communicatively coupled to the at least one processor, and a memory communicatively coupled to the at least one processor. The at least one processor is configured to receive downlink control information (DCI) or a radio resource control (RRC) message indicating a configuration of an uplink burst region of a downlink-centric slot, the configuration allocating resources within the uplink burst region between a physical uplink shared channel (PUSCH) and a physical uplink control channel (PUCCH) or uplink control information (UCI). The at least one processor is further configured to generate a feedback signal (e.g., Transmission Control Protocol (TCP) acknowledgement (ACK)) corresponding to a downlink data packet (e.g., TCP data packet) received from a scheduling entity and transmit the feedback signal to the scheduling entity via the PUSCH configured in the uplink burst region of the downlink-centric slot. The at least one processor is also configured to receive the TCP data packet from the scheduling entity.

In one example, a method for wireless communication (e.g., at a scheduling entity) is disclosed. Methods can practiced by a variety of devices such as a scheduling entity. The method includes transmitting a downlink data packet (e.g., Transmission Control Protocol (TCP) data packet) to a scheduled entity. The method further includes transmitting downlink control information (DCI) or a radio resource control (RRC) message indicating a configuration of an uplink burst region of a downlink-centric slot, the configuration allocating resources within the uplink burst region between a physical uplink shared channel (PUSCH) and a physical uplink control channel (PUCCH) or uplink control information (UCI). The method also includes receiving a feedback signal (e.g., TCP acknowledgement (ACK)) corresponding to the transmitted downlink data packet from the scheduled entity via the PUSCH configured in the uplink burst region of the downlink-centric slot.

In another example, a scheduling entity for wireless communication is disclosed. The scheduling entity includes means for transmitting a downlink data packet (e.g., Transmission Control Protocol (TCP) data packet) to a scheduled entity. The scheduling entity further includes means for transmitting downlink control information (DCI) or a radio resource control (RRC) message indicating a configuration of an uplink burst region of a downlink-centric slot, the configuration allocating resources within the uplink burst region between a physical uplink shared channel (PUSCH) and a physical uplink control channel (PUCCH) or uplink control information (UCI). The scheduling entity also includes means for receiving a feedback signal (e.g., TCP acknowledgement (ACK)) corresponding to the transmitted downlink data packet from the scheduled entity via the PUSCH configured in the uplink burst region of the downlink-centric slot.

In a further example, a computer-readable medium storing computer-executable code for wireless communication is disclosed, which includes code for causing a computer to transmit a downlink data packet (e.g., Transmission Control Protocol (TCP)) data packet to a scheduled entity. The code further causes the computer to transmit downlink control information (DCI) or a radio resource control (RRC) message indicating a configuration of an uplink burst region of a downlink-centric slot, the configuration allocating resources within the uplink burst region between a physical uplink shared channel (PUSCH) and a physical uplink control channel (PUCCH) or uplink control information (UCI). The code also causes the computer to receive a feedback signal (e.g., TCP acknowledgement (ACK)) corresponding to the transmitted downlink data packet from the scheduled entity via the PUSCH configured in the uplink burst region of the downlink-centric slot.

In another example, a scheduling entity for wireless communication is disclosed. The scheduling entity includes at least one processor, a transceiver communicatively coupled to the at least one processor, and a memory communicatively coupled to the at least one processor. The at least one processor is configured to transmit a downlink data packet (e.g., Transmission Control Protocol (TCP) data packet) to a scheduled entity. The at least one processor is further configured to transmit downlink control information (DCI) or a radio resource control (RRC) message indicating a configuration of an uplink burst region of a downlink-centric slot, the configuration allocating resources within the uplink burst region between a physical uplink shared channel (PUSCH) and a physical uplink control channel (PUCCH) or uplink control information (UCI). The at least one processor is also configured to receive a feedback signal (e.g., TCP acknowledgement (ACK)) corresponding to the transmitted downlink data packet from the scheduled entity via the PUSCH configured in the uplink burst region of the downlink-centric slot.

In one example, a method for transmitting a Transmission Control Protocol (TCP) acknowledgement (ACK) (e.g., at a scheduled entity) is disclosed. Methods can practiced by a variety of devices such as a scheduled entity. The method includes receiving downlink control information (DCI) or a radio resource control (RRC) message indicating a configuration of an uplink burst region of a downlink-centric slot, the configuration allocating resources within the uplink burst region for time-division multiplexing uplink data information with uplink control information in the uplink burst region. The method further includes generating a Transmission Control Protocol (TCP) acknowledgement (ACK) corresponding to a TCP data packet received from a scheduling entity and transmitting the TCP ACK to the scheduling entity with the uplink data information configured in the uplink burst region of the downlink-centric slot.

In another example, a method for wireless communication (e.g., at a scheduling entity) is disclosed. Methods can practiced by a variety of devices such as a scheduling entity. The method includes transmitting a Transmission Control Protocol (TCP) data packet to a scheduled entity. The method further includes transmitting downlink control information (DCI) or a radio resource control (RRC) message indicating a configuration of an uplink burst region of a downlink-centric slot, the configuration allocating resources within the uplink burst region for time-division multiplexing uplink data information with uplink control information in the uplink burst region. The method also includes receiving a TCP acknowledgement (ACK) corresponding to the transmitted TCP data packet from the scheduled entity with the uplink data information configured in the uplink burst region of the downlink-centric slot.

These and other aspects of the technology discussed herein will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
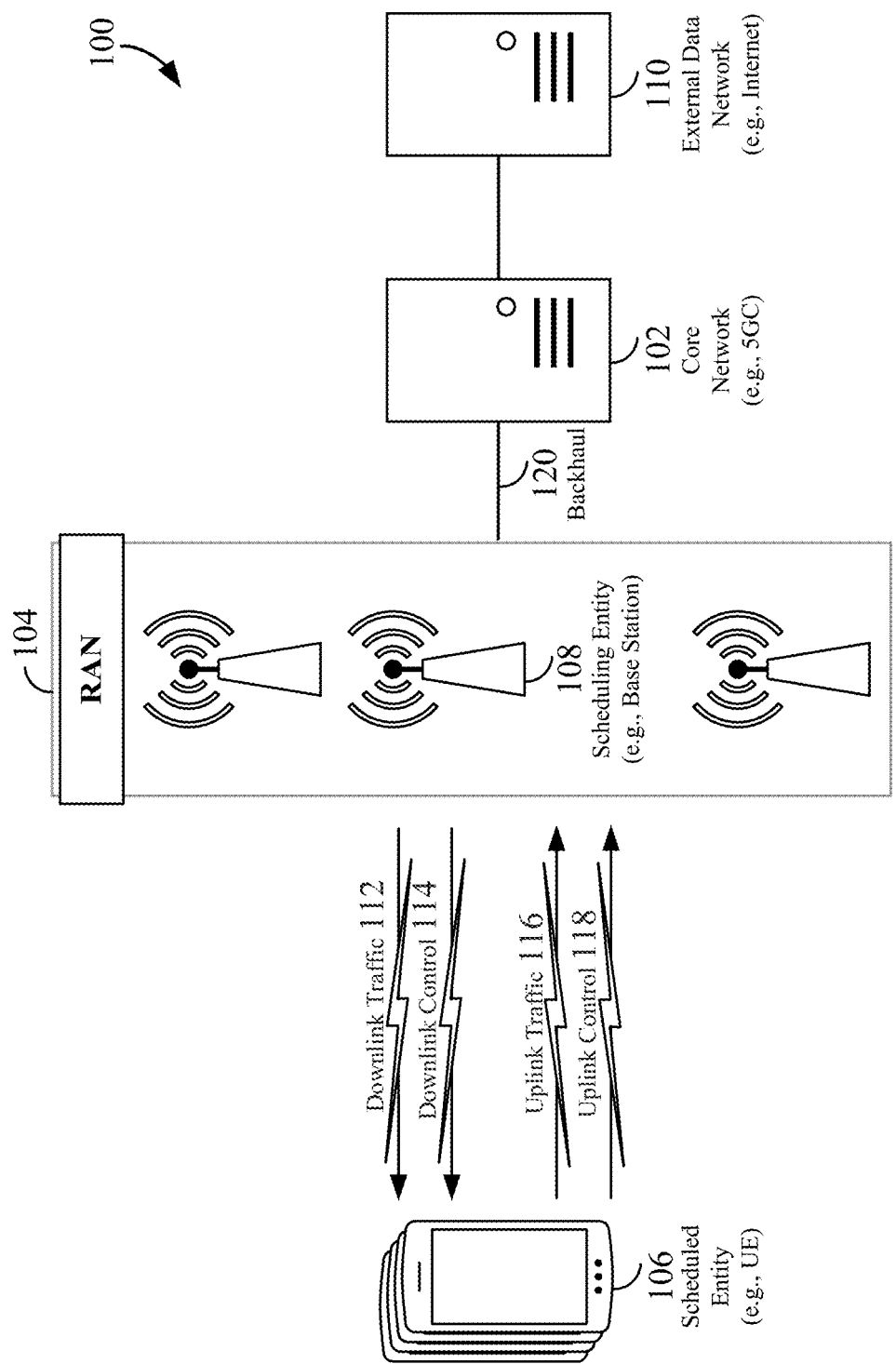
FIG. 1 is a schematic illustration of a wireless communication system according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

In 5G NR, faster transmissions are desired for mobile broadband and for other services and use cases. As such, some aspects of the present disclosure relate to maximizing a Transmission Control Protocol (TCP) downlink throughput. To maximize TCP downlink throughput, a fast turnaround time for transmitting a TCP acknowledgement (ACK) carried in a physical uplink shared channel (PUSCH) is desired. According to certain aspects, a TCP ACK may be carried in an uplink. The ACK may be positioned in a short burst (e.g., at an end of a slot). An uplink short burst may also carry uplink control signaling for physical uplink control channel (PUCCH) or uplink control information (UCI). Accordingly, the present disclosure provides a novel approach for multiplexing PUSCH (for carrying TCP ACK) and PUCCH/UCI in the uplink short burst to enable fast TCP turnaround. Multiplexing PUCCH and PUSCH can bring about a number of technical solutions with advantageous affects discussed herein.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes several interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services. A UE may take on many forms and can include a range of devices.

Within the present document, a "mobile" apparatus (aka a UE) need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
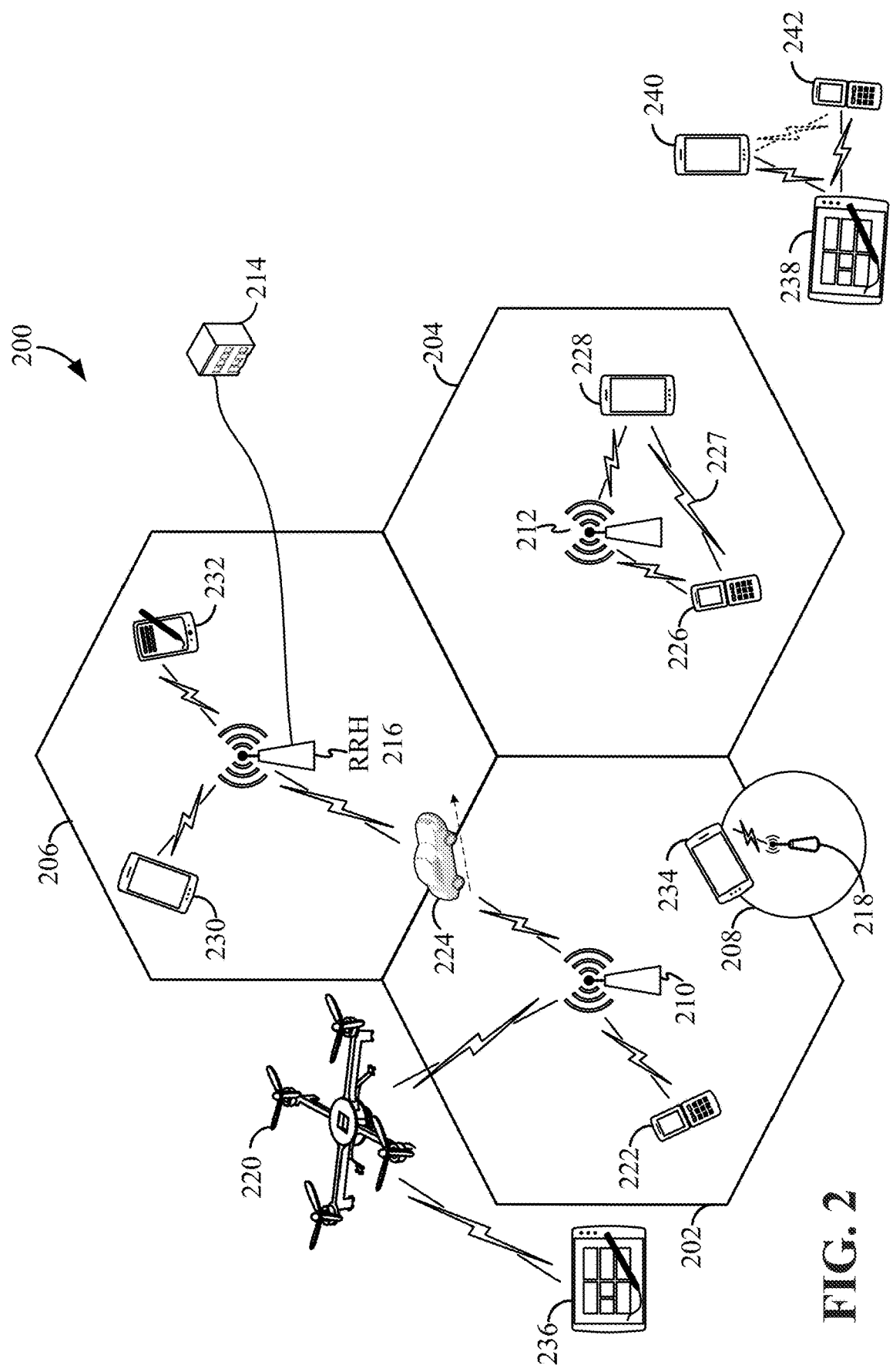
FIG. 2 is a conceptual illustration of an example of a radio access network according to some embodiments.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In some aspects of the disclosure, the scheduling entity and/or scheduled entity may be configured for beamforming and/or multiple-input multiple-output (MIMO) technology.

Figure 3:
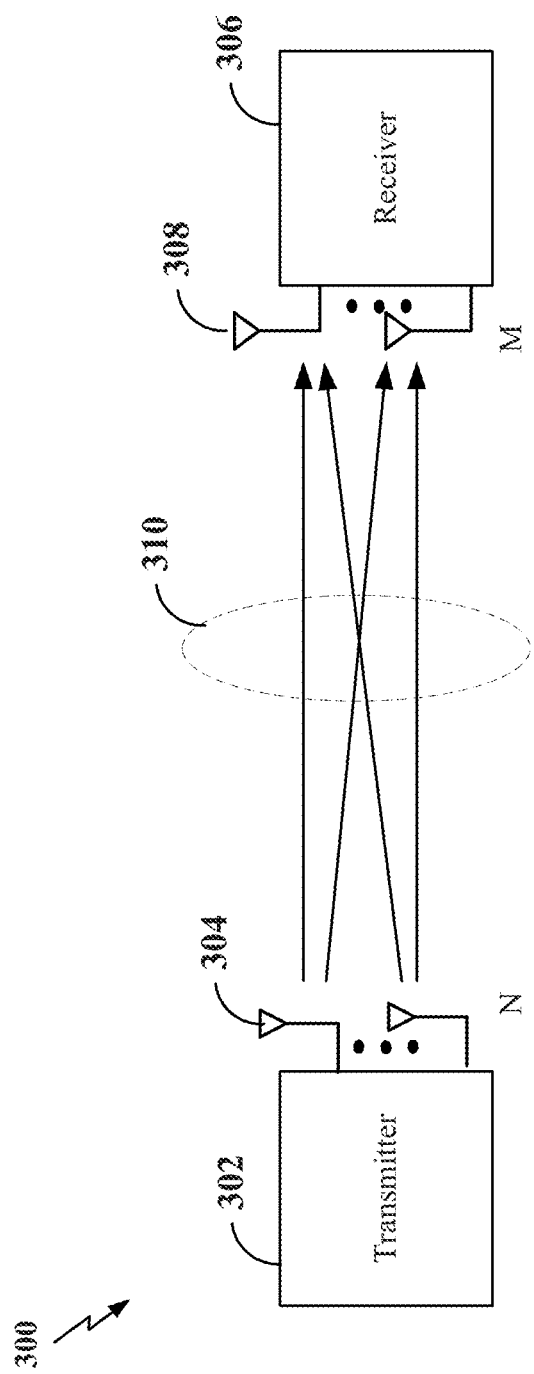
FIG. 3 is a block diagram illustrating a wireless communication system supporting multiple-input multiple-output (MIMO) communication according to some embodiments.

FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feedback the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications (Release 15), data is coded in differing manners. User data is coded using quasi-cyclic low-density parity check (LDPC) with two different base graphs. One base graph is used for large code blocks and/or high code rates, while another base graph is used otherwise. Control information and the physical broadcast channel (PBCH) are coded using Polar coding (e.g., based on nested sequences). For the control information and the PBCH, puncturing, shortening, and repetition are used for rate matching.

Those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier I-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
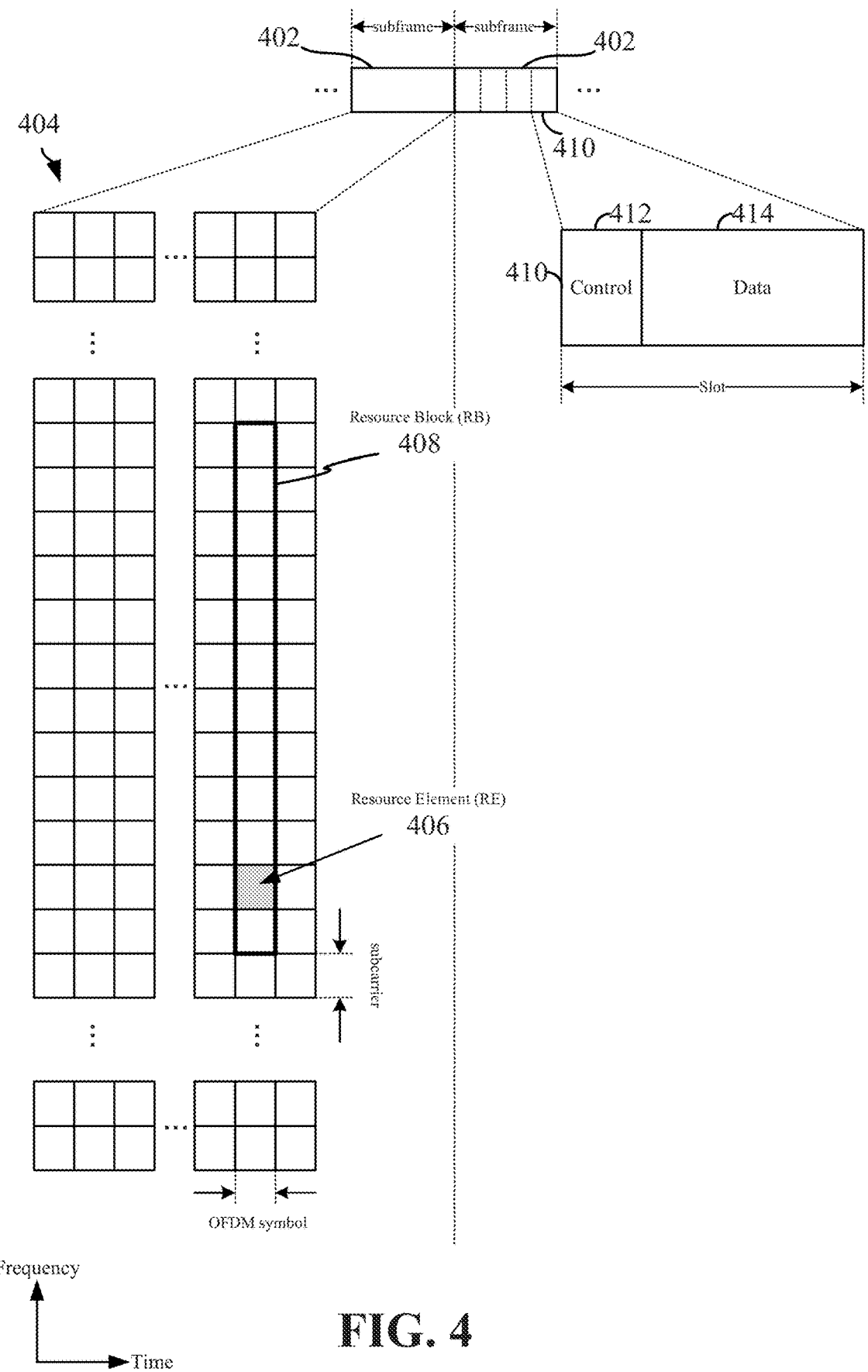
FIG. 4 is a schematic illustration of an organization of wireless resources in an air interface utilizing orthogonal frequency divisional multiplexing (OFDM) according to some embodiments.

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell, including but not limited to power control commands, scheduling information, a grant, and/or an assignment of REs for DL and UL transmissions.

In an UL transmission, the transmitting device (e.g., the scheduled entity 106) may utilize one or more REs 406 to carry UL control information 118 originating from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 5:
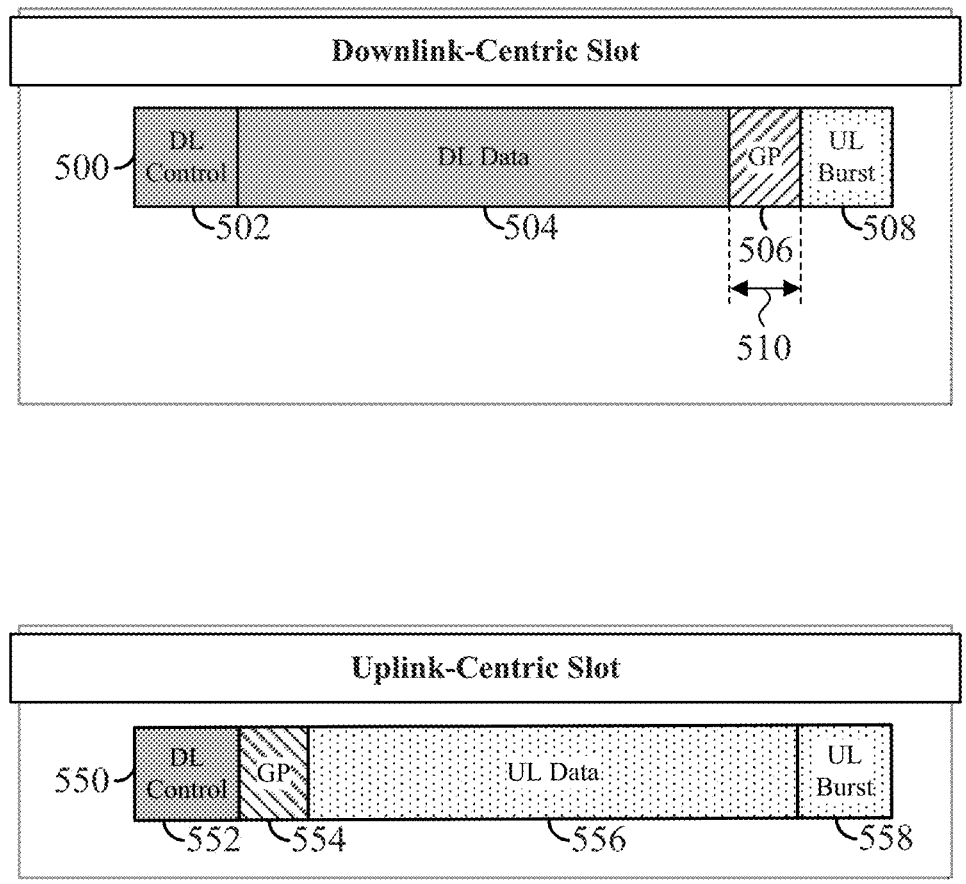
FIG. 5 is a schematic illustration of exemplary self-contained slots according to some aspects of the disclosure.

According to an aspect of the disclosure, one or more slots may be structured as self-contained slots. For example, FIG. 5 illustrates two example structures of self-contained slots 500 and 550. The self-contained slots 500 and/or 550 may be used, in some examples, in place of the slot 410 described above and illustrated in FIG. 4.

In the illustrated example, a DL-centric slot 500 may be a transmitter-scheduled slot. The nomenclature DL-centric generally refers to a structure wherein more resources are allocated for transmissions in the DL direction (e.g., transmissions from the scheduling entity 108 to the scheduled entity 106). Similarly, an UL-centric slot 550 may be a receiver-scheduled slot, wherein more resources are allocated for transmissions in the UL direction (e.g., transmissions from the scheduled entity 106 to the scheduling entity 108).

Each slot, such as the self-contained slots 500 and 550, may include transmit (Tx) and receive (Rx) portions. For example, in the DL-centric slot 500, the scheduling entity 108 first has an opportunity to transmit control information, e.g., on a PDCCH, in a DL control region 502, and then an opportunity to transmit DL user data or traffic, e.g., on a PDSCH in a DL data region 504. Following a guard period (GP) region 506 having a suitable duration 510, the scheduling entity 108 has an opportunity to receive UL data and/or UL feedback including any UL scheduling requests, CSF, a HARQ ACK/NACK, etc., in an UL burst 508 from other entities using the carrier. Here, a slot such as the DL-centric slot 500 may be referred to as a self-contained slot when all of the data carried in the data region 504 is scheduled in the control region 502 of the same slot; and further, when all of the data carried in the data region 504 is acknowledged (or at least has an opportunity to be acknowledged) in the UL burst 508 of the same slot. In this way, each self-contained slot may be considered a self-contained entity, not necessarily requiring any other slot to complete a scheduling-transmission-acknowledgment cycle for any given packet.

The GP region 506 may be included to accommodate variability in UL and DL timing. For example, latencies due to radio frequency (RF) antenna direction switching (e.g., from DL to UL) and transmission path latencies may cause the scheduled entity 204 to transmit early on the UL to match DL timing. Such early transmission may interfere with symbols received from the scheduling entity 108. Accordingly, the GP region 506 may allow an amount of time after the DL data region 504 to prevent interference, where the GP region 506 provides an appropriate amount of time for the scheduling entity 108 to switch its RF antenna direction, an appropriate amount of time for the over-the-air (OTA) transmission, and an appropriate amount of time for ACK processing by the scheduled entity.

Similarly, the UL-centric slot 550 may be configured as a self-contained slot. The UL-centric slot 550 is substantially similar to the DL-centric slot 500, including a guard period 554, an UL data region 556, and an UL burst region 558.

The slot structure illustrated in slots 500 and 550 is merely one example of self-contained slots. Other examples may include a common DL portion at the beginning of every slot, and a common UL portion at the end of every slot, with various differences in the structure of the slot between these respective portions. Other examples still may be provided within the scope of the present disclosure.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 6:
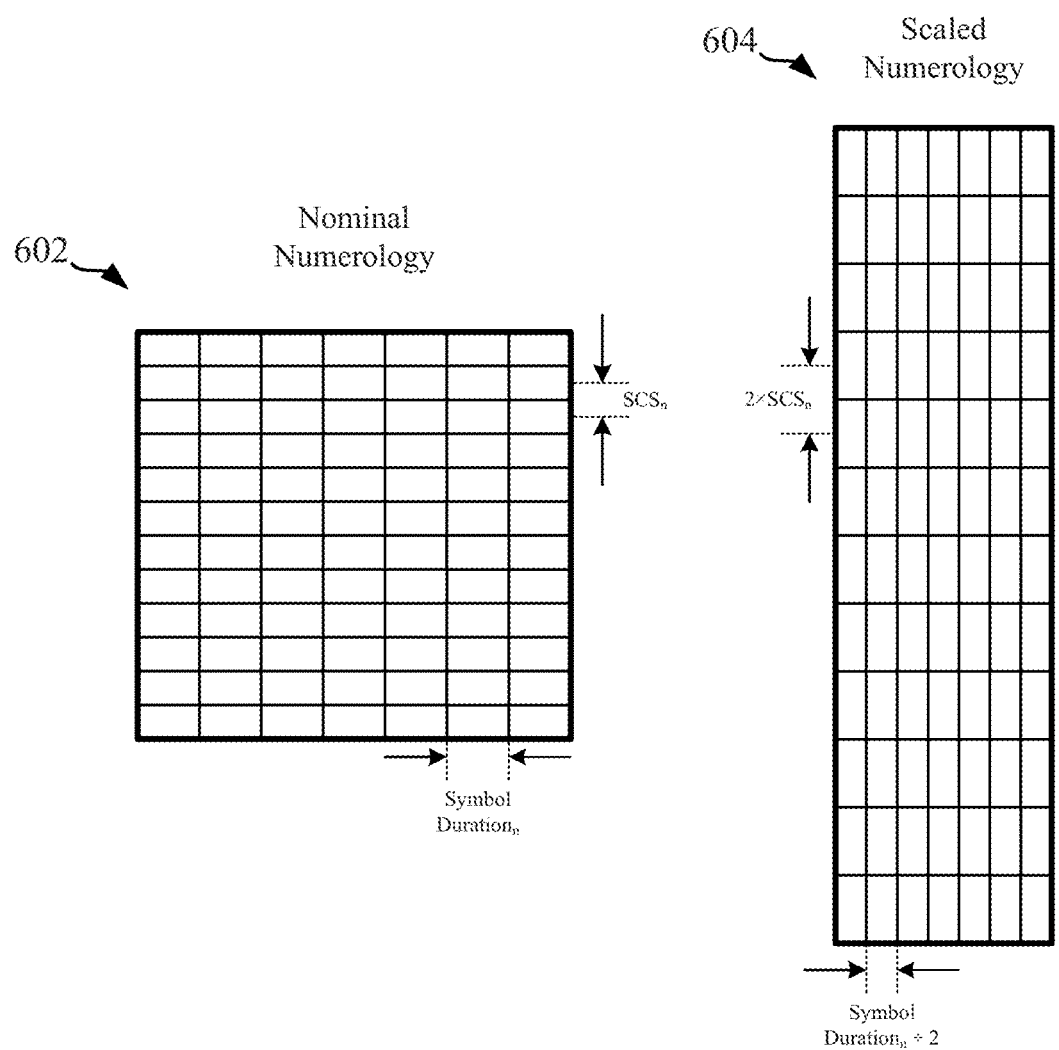
FIG. 6 is a schematic illustration of an OFDM air interface utilizing a scalable numerology according to some aspects of the disclosure.

To illustrate this concept of a scalable numerology, FIG. 6 shows a first RB 602 having a nominal numerology, and a second RB 604 having a scaled numerology. As one example, the first RB 602 may have a 'nominal' subcarrier spacing ($SCS_n$) of 30 kHz, and a 'nominal' symbol duration$_n$ of 333 µs. Here, in the second RB 604, the scaled numerology includes a scaled SCS of double the nominal SCS, or $2 \times SCS_n = 60$ kHz. Because this provides twice the bandwidth per symbol, it results in a shortened symbol duration to carry the same information. Thus, in the second RB 604, the scaled numerology includes a scaled symbol duration of half the nominal symbol duration, or (symbol duration$_n$)÷2=167 µs.

Multiplexing PUSCH and PUCCH in Uplink Short Burst

Figure 7:
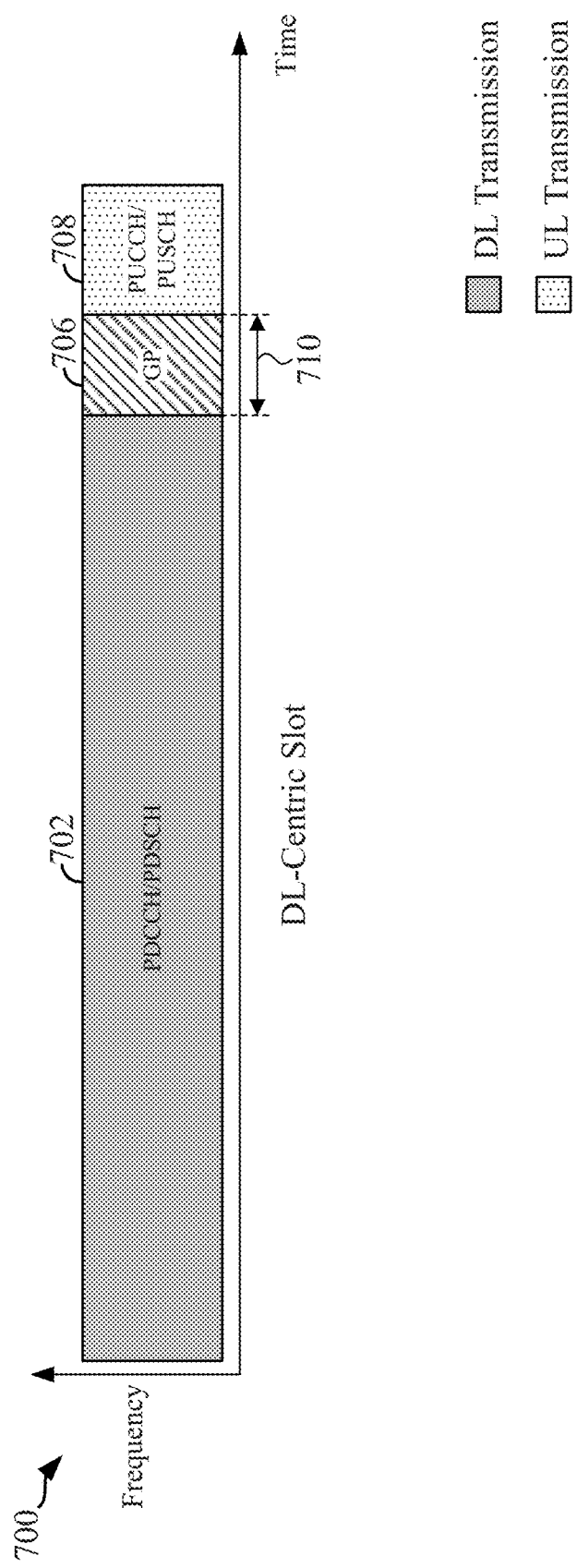
FIG. 7 illustrates an example structure of a downlink-centric slot according to some aspects of the disclosure.

FIG. 7 illustrates an example structure of a DL-centric slot 700. The DL-centric slot 700 may be used, in some examples, in place of the slot 410 described above and illustrated in FIG. 4.

In the illustrated example, the slot 700 may include a downlink transmission region 702 wherein the scheduling entity 202 may transmit, and the scheduled entity 204 may receive, control information (e.g., on a PDCCH) and/or user data or traffic (e.g., on a PDSCH). The slot 700 may further include a guard period (GP) region 706 having a suitable duration 710 and an UL short burst 708.

In 5G NR, faster transmissions are desired for mobile broadband. As such, some aspects of the present disclosure relate to maximizing a Transmission Control Protocol (TCP) downlink throughput. In TCP, when a sender (e.g., scheduling entity) transmits packets to a receiver (e.g., scheduled entity), the receiver may transmit back to the sender a signal (TCP ACK/NACK) acknowledging whether the packets were successfully received. If the sender receives a TCP ACK within a threshold time, this may indicate to the sender that a channel between the sender and the receiver is robust, and the sender may increase a data rate for transmitting packets to the receiver.

To maximize the TCP downlink throughput, a fast turn-around time for transmitting the TCP ACK carried in PUSCH is desired (e.g., 2 ms between the receiver receiving TCP data and transmitting the TCP ACK). However, with some physical channel structures, it may occur that a series of slots lasting longer than the desired turn-around time may not provide any opportunity for a receiving device to transmit uplink data that would include the TCP ACK. In various aspects of the present disclosure, one or more slots (e.g., all downlink-centric slots) on a TDD carrier may include a common UL burst. A UL burst may be one or more uplink transmissions performed by a device in a time-frequency resource region (e.g., of a downlink-centric slot) allocated to the device. The UL burst in a slot or in each slot provides an opportunity for a receiving device to transmit the TCP ACK in the UL direction. In this way, it becomes less likely that a device (e.g., receiving device) is required to wait for an extended period (e.g. ranging from X to Y seconds) to have an opportunity to transmit the TCP ACK carried in PUSCH. Therefore, the UL burst allows for fast turn-around of TCP ACK in 5G NR. In one example, the UL burst may be a transmission of PUSCH (e.g., carrying TCP ACK) in a first symbol and a transmission of PUCCH in a second symbol, wherein PUSCH and PUCCH are time division multiplexed in a downlink-centric slot. In another example, the UL burst may be a transmission of PUSCH in both a first symbol and a second symbol in a downlink-centric slot, wherein uplink control information (UCI) may be multiplexed (piggybacked) with PUSCH within one symbol or both symbol(s). In a further example, the UL burst may be a transmission of PUSCH (e.g., carrying TCP ACK) and a transmission of PUCCH, wherein PUSCH and PUCCH are frequency division multiplexed within a same symbol of a downlink-centric slot.

Referring to FIG. 7, there is illustrated a sample manner in which an ACK can be transmitted in a burst region. As shown, the TCP ACK may be carried in the UL short burst 708 at the end of the slot 700. The UL short burst 708 may also need to carry UL control signaling in PUCCH or uplink control information (UCI). Accordingly, aspects of the present disclosure provide and enable features for multiplexing PUSCH (for carrying TCP ACK) and PUCCH/UCI in the UL short burst 708 to enable fast TCP turnaround.

Figure 8:
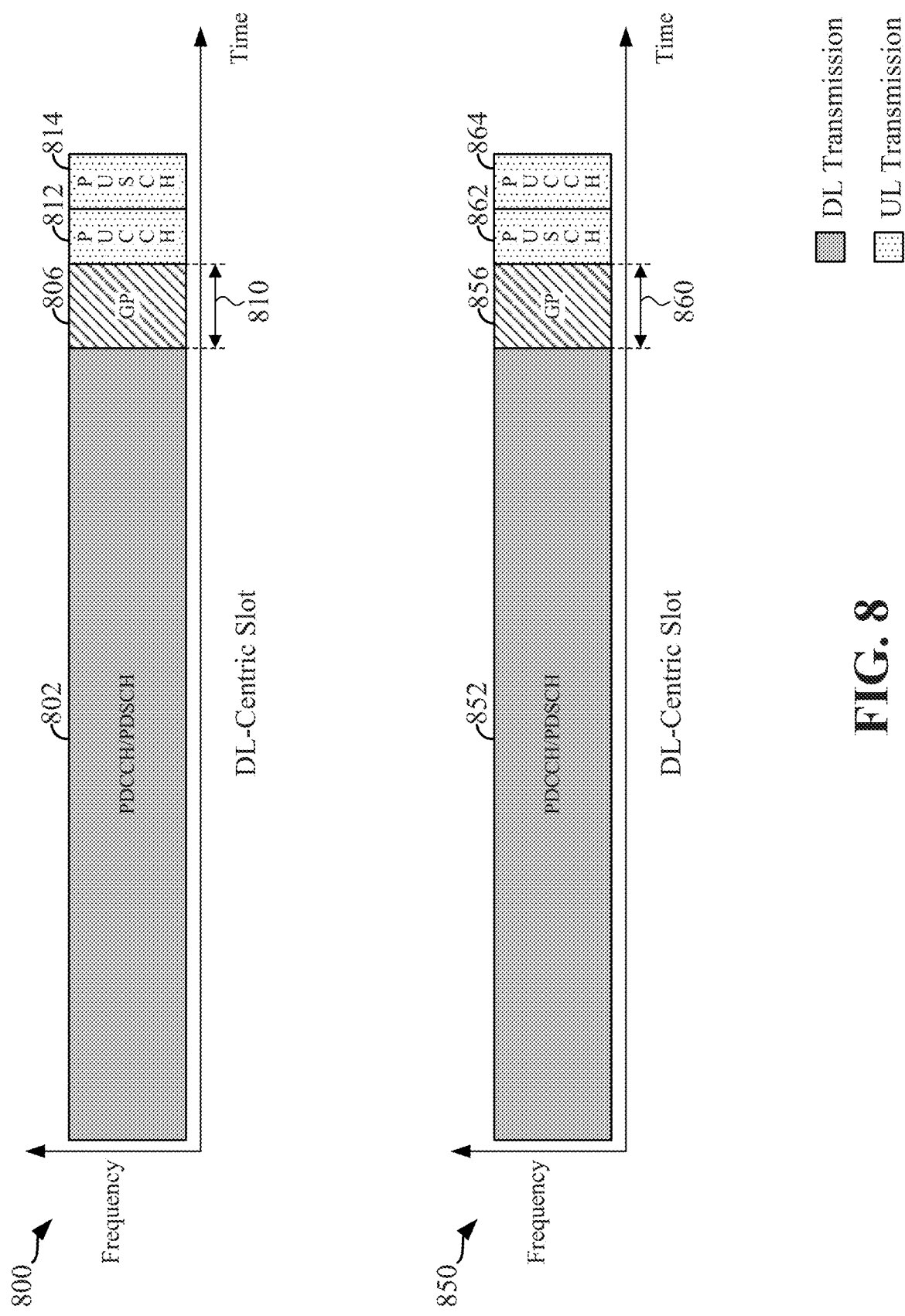
FIG. 8 illustrates example structures of downlink-centric slots that time division multiplex PUSCH and PUCCH according to some aspects of the disclosure.

FIG. 8 illustrates example structures of DL-centric slots 800 and 850 that time division multiplex PUSCH and PUCCH. In the slots 800 and 850, each of the PUCCH and PUSCH may have a length of one symbol.

In an example, the slot 800 may include a downlink transmission region 802 wherein the scheduling entity 202 may transmit, and the scheduled entity 204 may receive, control information (e.g., on a PDCCH) and/or user data or traffic (e.g., on a PDSCH). The slot 800 may further include a guard period (GP) region 806 having a suitable duration 810 and an UL short burst region wherein a PUCCH 812 is followed by a PUSCH 814 (carrying TCP ACK).

In another example, the slot 850 may include a downlink transmission region 852 wherein the scheduling entity 202 may transmit, and the scheduled entity 204 may receive, control information (e.g., on a PDCCH) and/or user data or traffic (e.g., on a PDSCH). The slot 850 may further include a guard period (GP) region 856 having a suitable duration 860 and an UL short burst region wherein a PUSCH 862 (carrying a TCP ACK) is followed by a PUCCH 864.

Figure 9:
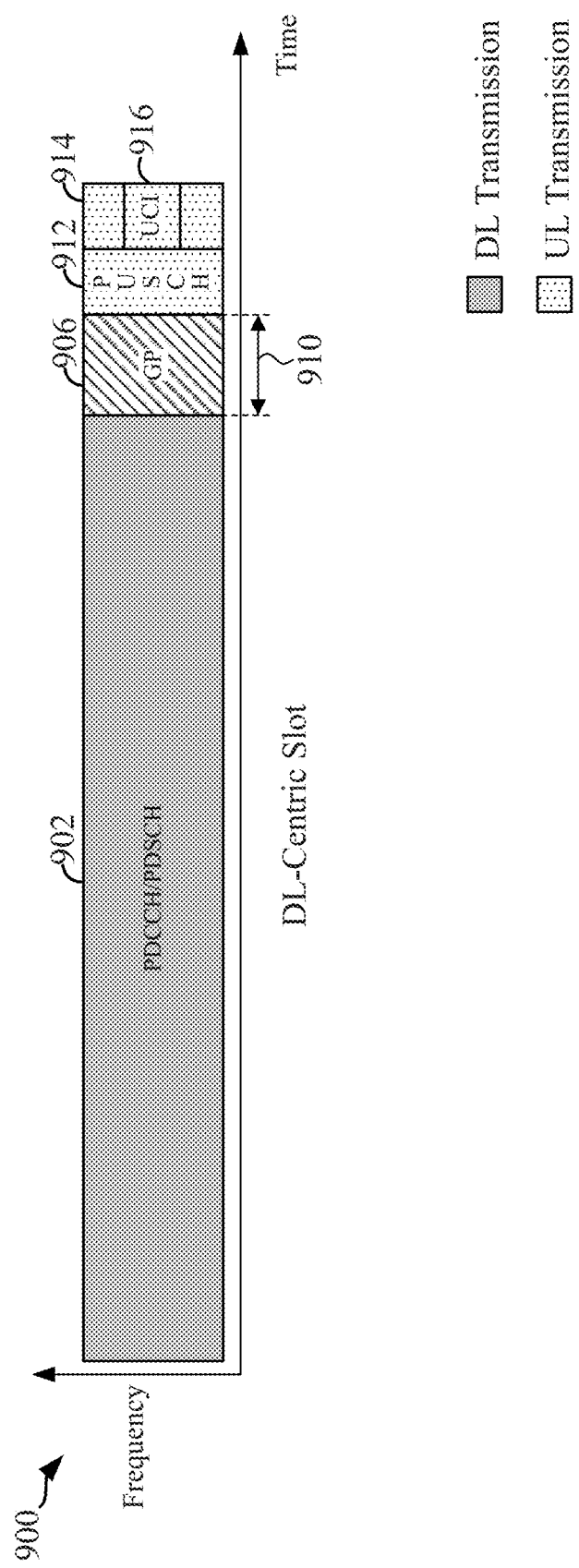
FIG. 9 illustrates an example structure of a downlink-centric slot wherein uplink control information (UCI) is multiplexed on PUSCH according to some aspects of the disclosure.

FIG. 9 illustrates an example structure of a DL-centric slot 900 wherein uplink control information (UCI) is multiplexed on PUSCH. In the slot 900, the PUSCH may have a length of two symbols.

The slot 900 may include a downlink transmission region 902 wherein the scheduling entity 202 may transmit, and the scheduled entity 204 may receive, control information (e.g., on a PDCCH) and/or user data or traffic (e.g., on a PDSCH). The slot 900 may further include a guard period (GP) region 906 having a suitable duration 910 and an UL short burst region having a first symbol 912 and a second symbol 914. In this example, both the first symbol 912 and the second symbol 914 may carry PUSCH. In a further aspect, uplink control information (UCI) may be multiplexed with PUSCH within one or both symbol(s). For example, UCI 916 may be piggybacked with PUSCH in the second symbol 914. While this illustration shows the UCI confined to a particular portion of the second UL burst symbol 914, it is to be understood that this is not intended to be limiting. That is, in various aspects of the disclosure, while both symbols within the UL burst may at least partially carry the PUSCH, any one or more resource elements (REs) within one or both symbols of the UL burst region may carry UCI bits, e.g., configured to carry the TCP ACK.

Figure 10:
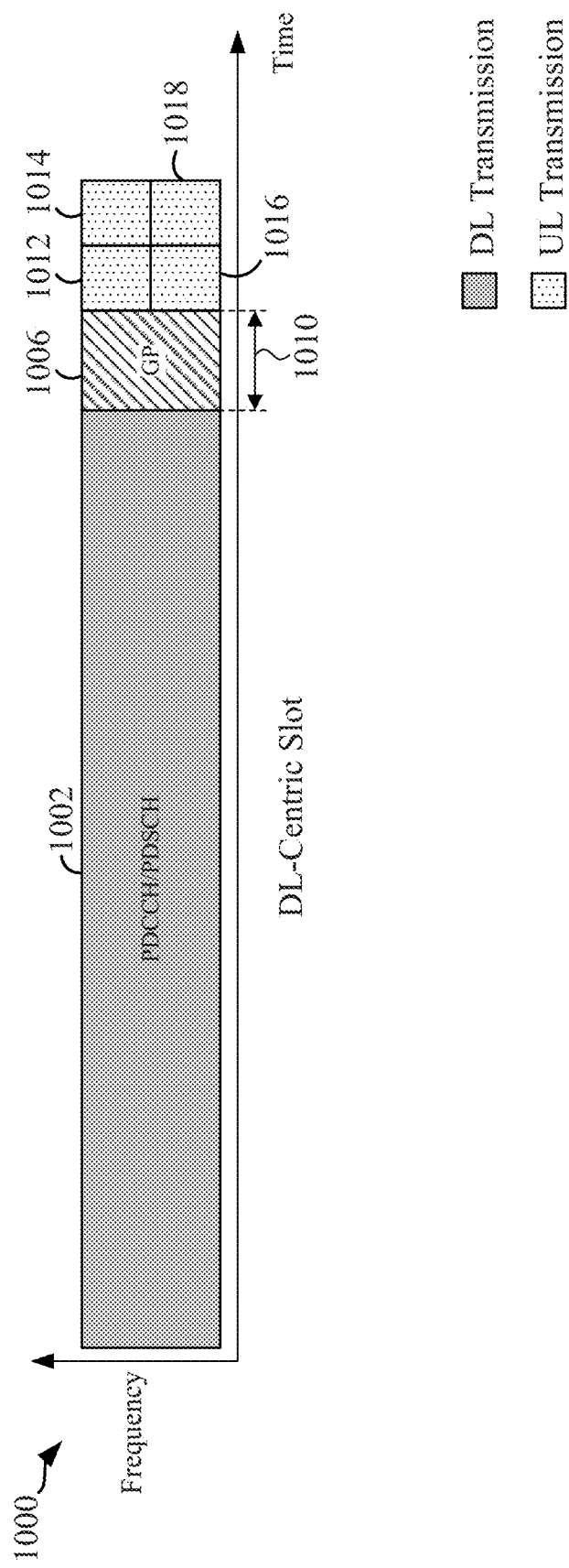
FIG. 10 illustrates an example structure of a downlink-centric slot that frequency division multiplexes PUSCH and PUCCH according to some aspects of the disclosure.

FIG. 10 illustrates an example structure of a DL-centric slot 1000 that frequency division multiplexes PUSCH and PUCCH. In the slot 900, the frequency location of PUSCH and PUCCH may be configurable.

The slot 1000 may include a downlink transmission region 1002 wherein the scheduling entity 202 may transmit, and the scheduled entity 204 may receive, control information (e.g., on a PDCCH) and/or user data or traffic (e.g., on a PDSCH). The slot 1000 may further include a guard period (GP) region 1006 having a suitable duration 1010 and an UL short burst region having a first frequency region 1012, a second frequency region 1014, a third frequency region 1016, and a fourth frequency region 1018.

In an example, PUCCH may be located in the first frequency region 1012 and the second frequency region 1014 while PUSCH (carrying TCP ACK) may be located in the third frequency region 1016 and the fourth frequency region 1018. In another example, PUSCH (carrying TCP ACK) may be located in the first frequency region 1012 and the second frequency region 1014 while PUCCH may be located in the third frequency region 1016 and the fourth frequency region 1018.

In some examples, the multiplexing of PUSCH and PUCCH/UCI in the UL short burst region of a slot may be configured utilizing UL burst configuration information, which may be carried, e.g., via downlink control information (DCI). For example, a portion of the DCI in a given slot may include UL burst configuration information, which may configure/reconfigure multiplexing options of PUCCH and PUSCH within that same slot and/or within one or more other, subsequent slots. That is, by utilizing DCI to carry UL burst configuration information for configuring the multiplexing of the PUSCH and PUCCH in an UL burst, a reconfiguration may be accomplished in a very rapid time scale, e.g., within a single slot. In another example, the multiplexing of PUSCH and PUCCH/UCI in the UL short burst region of a slot may be configured via higher layer signaling, including but not limited to radio resource control (RRC) signaling. In general, RRC signaling may be sent on a slower time scale than DCI, to reconfigure scheduled entity (UE) behavior. Furthermore, DCI may generally be carried on a downlink control channel (e.g., the PDCCH). On the other hand, higher-layer signaling such as RRC signaling may generally be carried on a downlink data channel (e.g., the PDSCH).

According to certain aspects, the UL burst configuration information utilized to configure the multiplexing of PUSCH and PUCCH/UCI in the UL short burst may select from among the slot structures described above with respect to FIGS. 8-10. For example, the UL burst configuration information may indicate a time-division duplexing of the PUCCH and PUSCH within the UL burst. That is, the UL burst configuration information may indicate which symbol of the UL short burst is to be used for carrying PUSCH (for sending the TCP ACK) or PUCCH (e.g., first symbol, second symbol, or both the first and second symbols). In another example, the UL burst configuration information may indicate if UCI is to be piggybacked with PUSCH in one or more symbol(s) of the UL short burst. In a further example, the UL burst configuration information may indicate which frequencies within a symbol of the UL short burst are to be used for carrying PUSCH (for sending the TCP ACK) or PUCCH. Upon the scheduled entity receiving the UL burst configuration information indicating the multiplexing of PUSCH and PUCCH/UCI in the UL short burst, as well as a scheduling grant providing resources within the designated portion of the UL burst within which the scheduled entity may transmit UL data, the scheduled entity may transmit the TCP ACK via PUSCH carried in the UL short burst.

Figure 11:
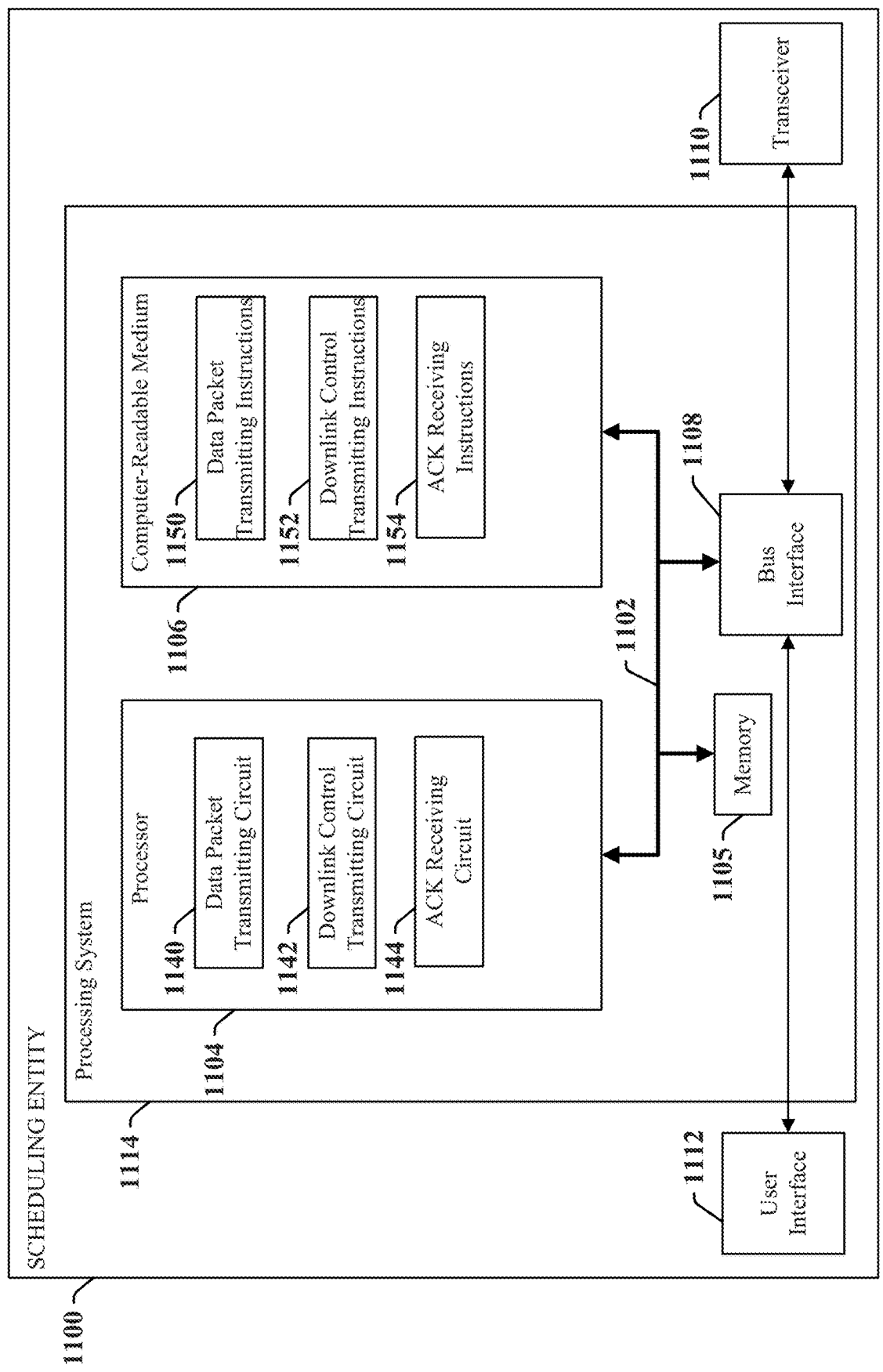
FIG. 11 is a block diagram conceptually illustrating an example of a hardware implementation for a scheduling entity according to some aspects of the disclosure.

FIG. 11 is a block diagram illustrating an example of a hardware implementation for a scheduling entity 1100 employing a processing system 714. For example, the scheduling entity 1100 may be a user equipment (UE) as illustrated in any one or more of FIGS. 1, 2, and/or 3. In another example, the scheduling entity 1100 may be a base station as illustrated in any one or more of FIGS. 1, 2, and/or 3.

The scheduling entity 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1100 may be configured to perform any one or more of the functions described herein. That is, the processor 1104, as utilized in a scheduling entity 1100, may be used to implement any one or more of the processes and procedures described below and illustrated in FIG. 12.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a communication interface or means for communicating with various other apparatus over a transmission medium. Depending upon the nature of the apparatus, a user interface 1112 (e.g., keypad, display, speaker, microphone, joystick) may also be provided. Of course, such a user interface 1112 is optional, and may be omitted in some examples, such as a base station.

In some aspects of the disclosure, the processor 1104 may include data packet transmitting circuitry 1140 configured for various functions, including, for example, transmitting a downlink data packet (e.g., Transmission Control Protocol (TCP) data packet) to a scheduled entity. For example, the data packet transmitting circuitry 1140 may be configured to implement one or more of the functions described below in relation to FIG. 12, including, e.g., block 1202.

In some aspects of the disclosure, the processor 1104 may include downlink control transmitting circuitry 1142 configured for various functions, including, for example, transmitting downlink control information (DCI) or a radio resource control (RRC) message indicating a configuration of an uplink burst region of a downlink-centric slot, the configuration allocating resources within the uplink burst region between a physical uplink shared channel (PUSCH) and a physical uplink control channel (PUCCH) or uplink control information (UCI). The downlink control transmitting circuitry 1142 may also be configured for transmitting a downlink grant comprising a grant of resources on which to transmit information corresponding to a feedback signal (e.g., TCP acknowledgement (ACK)). For example, the downlink control transmitting circuitry 1142 may be configured to implement one or more of the functions described below in relation to FIG. 12, including, e.g., block 1204.

In some aspects of the disclosure, the processor 1104 may include ACK receiving circuitry 1144 configured for various functions, including, for example, receiving a feedback signal (e.g., TCP acknowledgement (ACK)) corresponding to the transmitted downlink data packet (e.g., TCP data packet) from the scheduled entity via the PUSCH configured in the uplink burst region of the downlink-centric slot. For example, the ACK receiving circuitry 1144 may be configured to implement one or more of the functions described below in relation to FIG. 12, including, e.g., block 1206.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106. The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1106 may include data packet transmitting instructions/software 1150 configured for various functions, including, for example, transmitting a downlink data packet (e.g., Transmission Control Protocol (TCP) data packet) to a scheduled entity. For example, the data packet transmitting instructions/software 1150 may be configured to implement one or more of the functions described above in relation to FIG. 12, including, e.g., block 1202.

In one or more examples, the computer-readable storage medium 1106 may include downlink control transmitting instructions/software 1152 configured for various functions, including, for example, transmitting downlink control information (DCI) or a radio resource control (RRC) message indicating a configuration of an uplink burst region of a downlink-centric slot, the configuration allocating resources within the uplink burst region between a physical uplink shared channel (PUSCH) and a physical uplink control channel (PUCCH) or uplink control information (UCI). The downlink control transmitting instructions/software 1152 may also be configured for transmitting a downlink grant comprising a grant of resources on which to transmit information corresponding to a feedback signal (e.g., TCP acknowledgement (ACK)). For example, the downlink control transmitting instructions/software 1152 may be configured to implement one or more of the functions described above in relation to FIG. 12, including, e.g., block 1204.

In one or more examples, the computer-readable storage medium 1106 may include ACK receiving instructions/software 1154 configured for various functions, including, for example, receiving a feedback signal (e.g., TCP acknowledgement (ACK)) corresponding to the transmitted downlink data packet (e.g., TCP data packet) from the scheduled entity via the PUSCH configured in the uplink burst region of the downlink-centric slot. For example, the ACK receiving instructions/software 1154 may be configured to implement one or more of the functions described above in relation to FIG. 12, including, e.g., block 1206.

In one configuration, the apparatus 1100 for wireless communication includes means for transmitting a downlink data packet (e.g., Transmission Control Protocol (TCP) data packet) to a scheduled entity, means for transmitting downlink control information (DCI) or a radio resource control (RRC) message indicating a configuration of an uplink burst region of a downlink-centric slot, the configuration allocating resources within the uplink burst region between a physical uplink shared channel (PUSCH) and a physical uplink control channel (PUCCH) or uplink control information (UCI), means for receiving a feedback signal (e.g., TCP acknowledgement (ACK)) corresponding to the transmitted downlink data packet (e.g., TCP data packet) from the scheduled entity via the PUSCH configured in the uplink burst region of the downlink-centric slot, and means for transmitting a downlink grant comprising a grant of resources on which to transmit information corresponding to the feedback signal (e.g., TCP ACK). In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Figure 12:
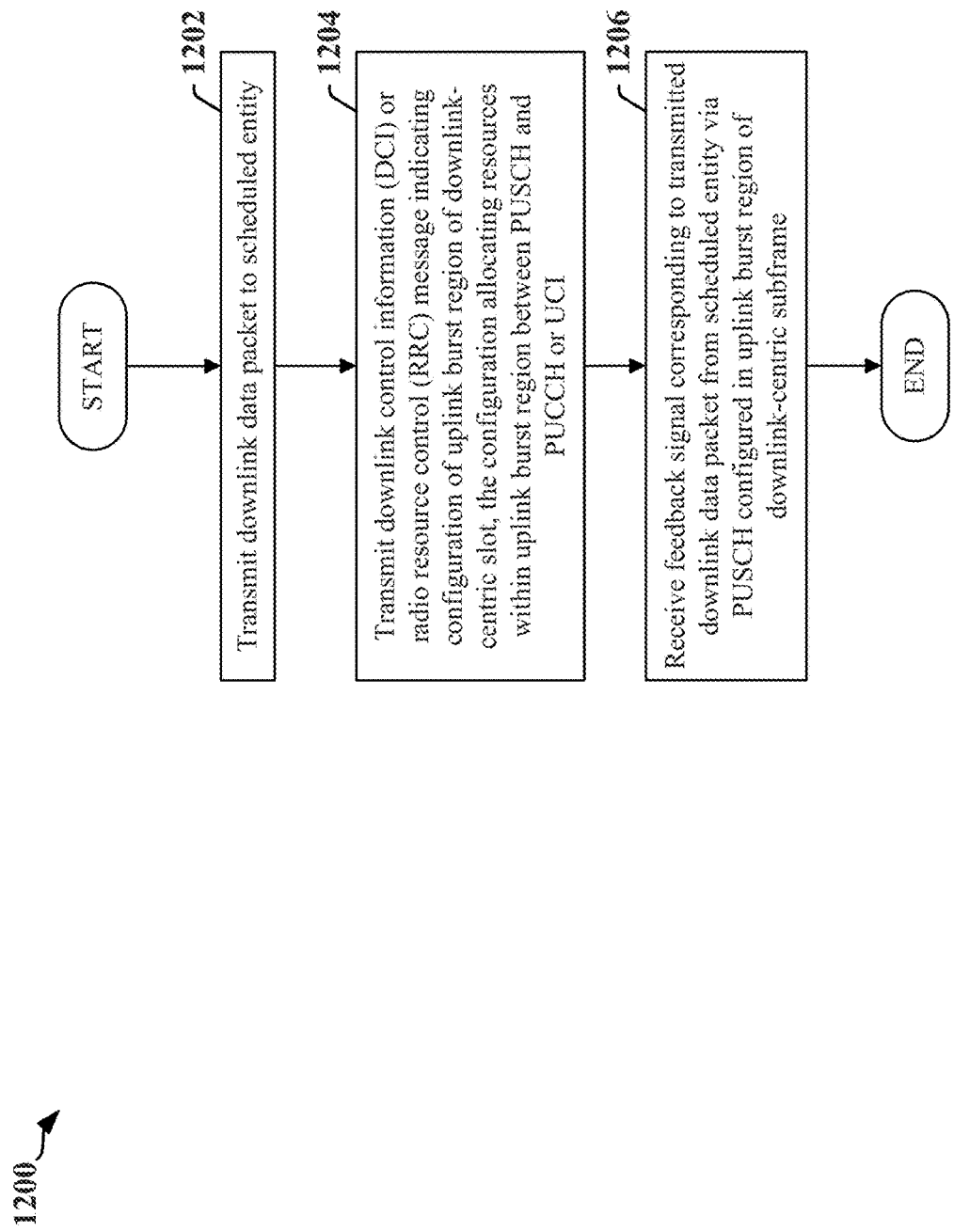
FIG. 12 is a flow chart illustrating an exemplary process for wireless communication at a scheduling entity according to some aspects of the disclosure.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1, 2, and/or 3, and utilizing, for example, the processes and/or algorithms described herein in relation to FIG. 12.

FIG. 12 is a flow chart illustrating an exemplary process 1200 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduling entity 1100 illustrated in FIG. 11. In some examples, the process 1200 may be carried out by any suitable apparatus or means for carrying out the functions or algorithm described below.

At block 1202, the scheduling entity may transmit a downlink data packet (e.g., Transmission Control Protocol (TCP) data packet) to a scheduled entity.

At block 1204, the scheduling entity may transmit downlink control information (DCI) or a radio resource control (RRC) message indicating a configuration of an uplink burst region of a downlink-centric slot, the configuration allocating resources within the uplink burst region between a physical uplink shared channel (PUSCH) and a physical uplink control channel (PUCCH) or uplink control information (UCI). In an aspect, the PUSCH is multiplexed (e.g., time-domain multiplexed and/or frequency-domain multiplexed) with at least one of the PUCCH or the UCI in the uplink burst region.

At block 1206, the scheduling entity may receive a feedback signal (e.g., TCP acknowledgement (ACK)) corresponding to the transmitted downlink data packet (e.g., TCP data packet) from the scheduled entity via the PUSCH configured in the uplink burst region of the downlink-centric slot.

In an aspect of the disclosure, the transmitting at block 1204 includes configuring the PUSCH to be located in a first symbol of the uplink burst region and the PUCCH to be located in a second symbol of the uplink burst region. In another aspect, the transmitting at block 1204 includes configuring the PUCCH to be located in a first symbol of the uplink burst region and the PUSCH to be located in a second symbol of the uplink burst region.

In an aspect of the disclosure, the transmitting at block 1204 includes configuring the PUSCH to be located in a same symbol as the UCI in the uplink burst region. In another aspect, the transmitting at block 1204 includes configuring the PUSCH to be located in a first symbol and a second symbol of the uplink burst region.

In an aspect of the disclosure, the transmitting at block 1204 includes configuring the PUSCH to be located in a same symbol as the PUCCH in the uplink burst region. Moreover, the PUSCH is located across a first set of frequencies and the PUCCH is located across a second set of frequencies in the same symbol.

In an aspect of the disclosure, the scheduling entity further transmits a downlink grant comprising a grant of resources on which to transmit information corresponding to the feedback signal (e.g., TCP ACK).

Figure 13:
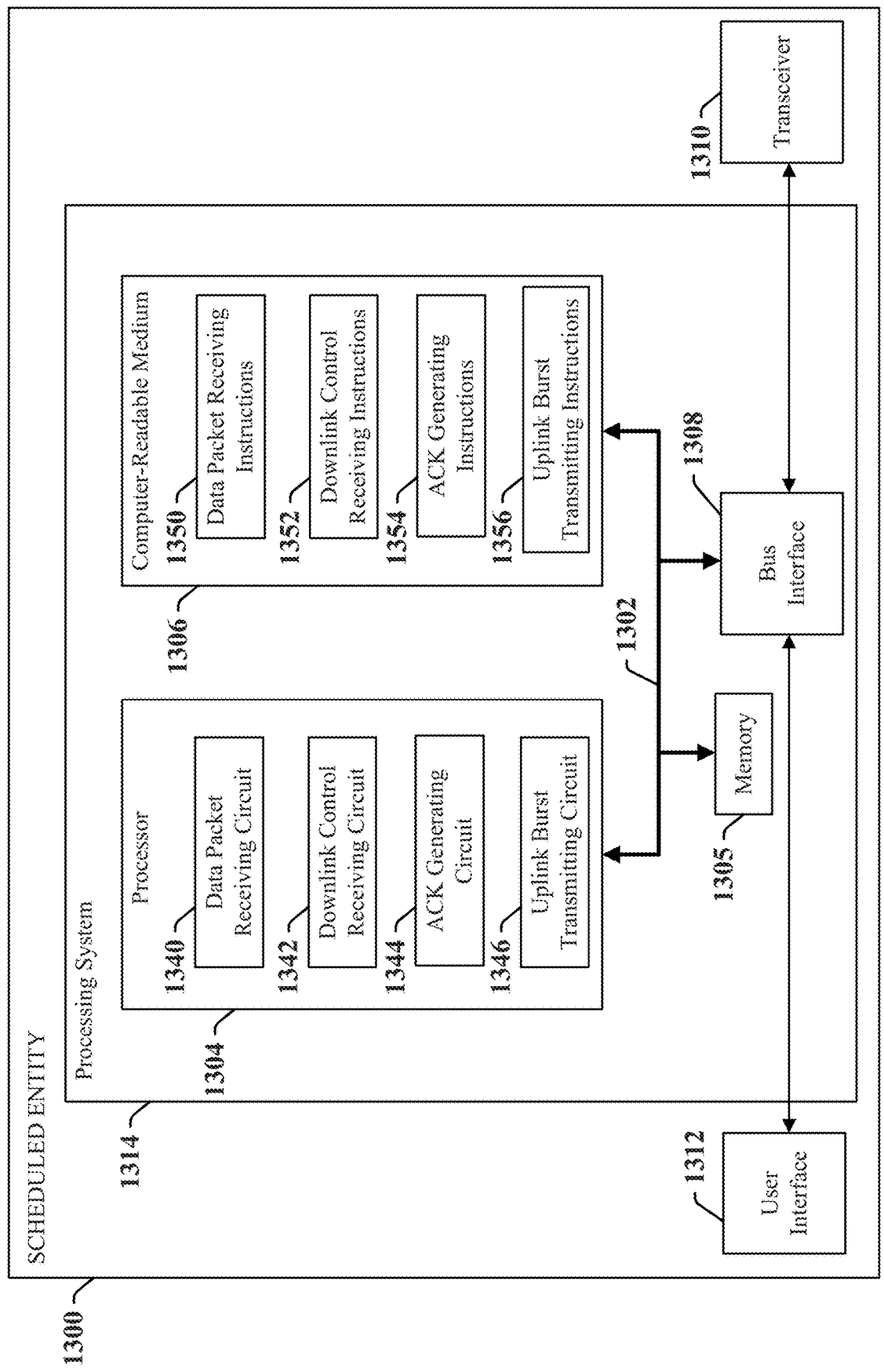
FIG. 13 is a block diagram conceptually illustrating an example of a hardware implementation for a scheduled entity according to some aspects of the disclosure.

FIG. 13 is a conceptual diagram illustrating an example of a hardware implementation for an exemplary scheduled entity 1300 employing a processing system 1314. In accordance with various aspects of the disclosure, an element, or any portion of an element, or any combination of elements may be implemented with a processing system 1314 that includes one or more processors 1304. For example, the scheduled entity 1300 may be a user equipment (UE) as illustrated in any one or more of FIGS. 1, 2, and/or 3.

The processing system 1314 may be substantially the same as the processing system 1114 illustrated in FIG. 11, including a bus interface 1308, a bus 1302, memory 1305, a processor 1304, and a computer-readable medium 1306. Furthermore, the scheduled entity 1300 may include a user interface 1312 and a transceiver 1310 substantially similar to those described above in FIG. 11. The processor 1304, as utilized in a scheduled entity 1300, may be used to implement any one or more of the processes described below and illustrated in FIG. 14.

In some aspects of the disclosure, the processor 1304 may include data packet receiving circuitry 1340 configured for various functions, including, for example, receiving a downlink data packet (e.g., Transmission Control Protocol (TCP) data packet) from the scheduling entity. For example, the data packet receiving circuitry 1340 may be configured to implement one or more of the functions described below in relation to FIG. 14, including, e.g., block 1402.

In some aspects of the disclosure, the processor 1304 may include downlink control receiving circuitry 1342 configured for various functions, including, for example, receiving downlink control information (DCI) or a radio resource control (RRC) message indicating a configuration of an uplink burst region of a downlink-centric slot, the configuration allocating resources within the uplink burst region between a physical uplink shared channel (PUSCH) and a physical uplink control channel (PUCCH) or uplink control information (UCI). The downlink control receiving circuitry 1342 may also be configured to receive a downlink grant comprising a grant of resources on which to receive information corresponding to a feedback signal (e.g., TCP acknowledgement (ACK)). For example, the downlink control receiving circuitry 1340 may be configured to implement one or more of the functions described below in relation to FIG. 14, including, e.g., block 1404.

In some aspects of the disclosure, the processor 1304 may include ACK generating circuitry 1344 configured for various functions, including, for example, generating a feedback signal (e.g., Transmission Control Protocol (TCP) acknowledgement (ACK)) corresponding to a downlink data packet (e.g., TCP data packet) received from a scheduling entity. For example, the ACK generating circuitry 1344 may be configured to implement one or more of the functions described below in relation to FIG. 14, including, e.g., block 1406.

In some aspects of the disclosure, the processor 1304 may include uplink burst transmitting circuitry 1346 configured for various functions, including, for example, transmitting the feedback signal (e.g., TCP ACK) to the scheduling entity via the PUSCH configured in the uplink burst region of the downlink-centric slot. For example, the uplink burst transmitting circuitry 1346 may be configured to implement one or more of the functions described below in relation to FIG. 14, including, e.g., block 1408.

In one or more examples, the computer-readable storage medium 1306 may include data packet receiving instructions/software 1350 configured for various functions, including, for example, receiving a downlink data packet (e.g., Transmission Control Protocol (TCP)) data packet from a scheduling entity. For example, the data packet receiving instructions/software 1350 may be configured to implement one or more of the functions described above in relation to FIG. 14, including, e.g., block 1402.

In one or more examples, the computer-readable storage medium 1306 may include downlink control receiving instructions/software 1352 configured for various functions, including, for example, receiving downlink control information (DCI) or a radio resource control (RRC) message indicating a configuration of an uplink burst region of a downlink-centric slot, the configuration allocating resources within the uplink burst region between a physical uplink shared channel (PUSCH) and a physical uplink control channel (PUCCH) or uplink control information (UCI). The downlink control receiving instructions/software 1352 may also be configured to receive a downlink grant comprising a grant of resources on which to receive information corresponding to a feedback signal (e.g., TCP acknowledgement (ACK)). For example, the downlink control receiving instructions/software 1352 may be configured to implement one or more of the functions described above in relation to FIG. 14, including, e.g., block 1404.

In one or more examples, the computer-readable storage medium 1306 may include ACK generating instructions/software 1354 configured for various functions, including, for example, generating a feedback signal (e.g., Transmission Control Protocol (TCP) acknowledgement (ACK)) corresponding to a downlink data packet (e.g., TCP data packet) received from a scheduling entity. For example, the ACK generating instructions/software 1354 may be configured to implement one or more of the functions described above in relation to FIG. 14, including, e.g., block 1406.

In one or more examples, the computer-readable storage medium 1306 may include uplink burst transmitting instructions/software 1356 configured for various functions, including, for example, transmitting the feedback signal (e.g., TCP ACK) to the scheduling entity via the PUSCH configured in the uplink burst region of the downlink-centric slot. For example, the uplink burst transmitting instructions/software 1356 may be configured to implement one or more of the functions described above in relation to FIG. 14, including, e.g., block 1408.

In one configuration, the apparatus 1300 for wireless communication includes means for receiving downlink control information (DCI) or a radio resource control (RRC) message indicating a configuration of an uplink burst region of a downlink-centric slot, the configuration allocating resources within the uplink burst region between a physical uplink shared channel (PUSCH) and a physical uplink control channel (PUCCH) or uplink control information (UCI), means for generating a feedback signal (e.g., Transmission Control Protocol (TCP) acknowledgement (ACK)) corresponding to a downlink data packet (e.g., TCP data packet) received from a scheduling entity, means for transmitting the feedback signal (e.g., TCP ACK) to the scheduling entity via the PUSCH configured in the uplink burst region of the downlink-centric slot; means for receiving the downlink data packet (e.g., TCP data packet) from the scheduling entity; and means for receiving a downlink grant comprising a grant of resources on which to receive information corresponding to the feedback signal (e.g., TCP ACK). In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means.

Figure 14:
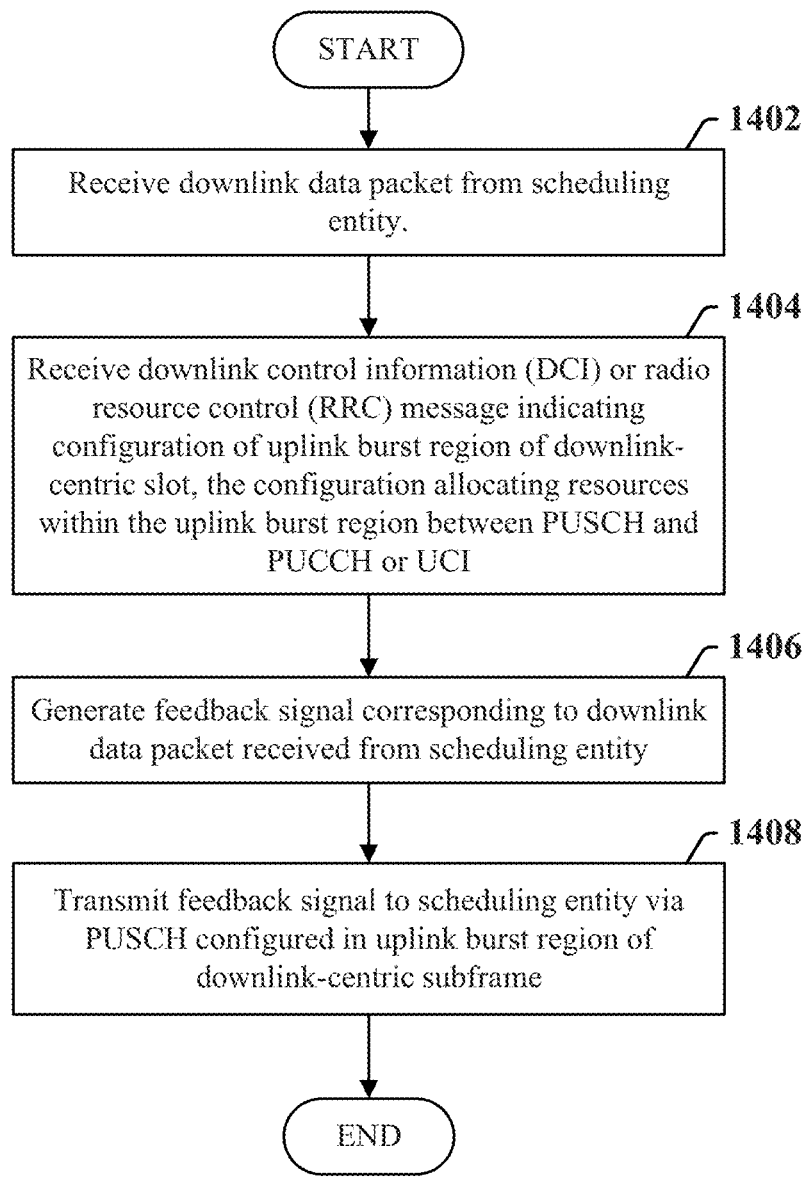
FIG. 14 is a flow chart illustrating an exemplary process for wireless communication at a scheduled entity according to some aspects of the disclosure.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1, 2, and/or 3, and utilizing, for example, the processes and/or algorithms described herein in relation to FIG. 14.

FIG. 14 is a flow chart illustrating an exemplary process 1400 for wireless communication in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the scheduled entity 1300 illustrated in FIG. 13. In some examples, the process 1400 may be carried out by any suitable apparatus or means for carrying out the functions or algorithm described below.

At block 1402, the scheduled entity may receive a downlink data packet (e.g., Transmission Control Protocol (TCP) data packet) from a scheduling entity.

At block 1404, the scheduled entity may receive downlink control information (DCI) or a radio resource control (RRC) message indicating a configuration of an uplink burst region of a downlink-centric slot, the configuration allocating resources within the uplink burst region between a physical uplink shared channel (PUSCH) and a physical uplink control channel (PUCCH) or uplink control information (UCI). In an aspect, the PUSCH is multiplexed (e.g., time-domain multiplexed and/or frequency-domain multiplexed) with at least one of the PUCCH or the UCI in the uplink burst region.

At block 1406, the scheduled entity may generate a feedback signal (e.g., TCP acknowledgement (ACK)) corresponding to the downlink data packet (e.g., TCP data packet) received from a scheduling entity.

At block 1408, the scheduled entity may transmit the feedback signal (e.g., TCP ACK) to the scheduling entity via the PUSCH configured in the uplink burst region of the downlink-centric slot.

In an aspect of the disclosure, the receiving at block 1404 includes configuring the PUSCH to be located in a first symbol of the uplink burst region and the PUCCH to be located in a second symbol of the uplink burst region. In an aspect, the receiving at block 1404 includes configuring the PUCCH to be located in a first symbol of the uplink burst region and the PUSCH to be located in a second symbol of the uplink burst region.

In an aspect of the disclosure, the receiving at block 1404 includes configuring the PUSCH to be located in a same symbol as the UCI in the uplink burst region. In another aspect, the receiving at block 1404 includes configuring the PUSCH to be located in a first symbol and a second symbol of the uplink burst region.

In an aspect of the disclosure, the receiving at block 1404 includes configuring the PUSCH to be located in a same symbol as the PUCCH in the uplink burst region, wherein the PUSCH is located across a first set of frequencies and the PUCCH is located across a second set of frequencies in the same symbol.

In an aspect of the disclosure, the scheduled entity may receive a downlink grant comprising a grant of resources on which to receive information corresponding to the feedback signal (e.g., TCP ACK).

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method operable at a scheduled entity for wireless communication, the method comprising:

receiving downlink control information (DCI) in a downlink-centric slot, the DCI indicating a configuration of an uplink burst region of the downlink-centric slot, the downlink-centric slot including more resources allocated for downlink transmissions than uplink transmissions, and the configuration determining a multiplexing arrangement of resources within the uplink burst region that multiplexes a physical uplink shared channel (PUSCH) with a physical uplink control channel (PUCCH) or uplink control information (UCI);

receiving a downlink data packet via a downlink data channel of the downlink-centric slot;

generating a Transmission Control Protocol (TCP) acknowledgment (ACK) corresponding to the downlink data packet; and transmitting the PUSCH configured in the uplink burst region of the downlink-centric slot, wherein the PUSCH comprises the TCP ACK.

2. The method of claim 1, further comprising configuring the PUSCH to be located in a first symbol of the uplink burst region and the PUCCH to be located in a second symbol of the uplink burst region.

3. The method of claim 1, further comprising configuring the PUCCH to be located in a first symbol of the uplink burst region and the PUSCH to be located in a second symbol of the uplink burst region.

4. The method of claim 1, further comprising configuring the PUSCH to be located in a same symbol as the UCI in the uplink burst region.

5. The method of claim 1, further comprising configuring the PUSCH to be located in a same symbol as the PUCCH in the uplink burst region, wherein the PUSCH is located across a first set of frequencies and the PUCCH is located across a second set of frequencies in the same symbol.

6. The method of claim 1, further comprising receiving a downlink grant comprising a grant of resources on which to receive information corresponding to the TCP ACK.

7. The method of claim 1, wherein the downlink data packet comprises a TCP data packet.

8. A scheduled entity for wireless communication, comprising:

at least one processor;

a transceiver communicatively coupled to the at least one processor; and a memory communicatively coupled to the at least one processor, wherein the at least one processor is configured to:

receive downlink control information (DCI) in a downlink-centric slot, the DCI indicating a configuration of an uplink burst region of the downlink-centric slot, the downlink-centric slot including more resources allocated for downlink transmissions than uplink transmissions, and the configuration determining a multiplexing arrangement of resources within the uplink burst region that multiplexes a physical uplink shared channel (PUSCH) with a physical uplink control channel (PUCCH) or uplink control information (UCI);

receive a downlink data packet via a downlink data channel of the downlink-centric slot; and transmit the PUSCH configured in the uplink burst region of the downlink-centric slot, wherein the PUSCH comprises a Transmission Control Protocol (TCP) acknowledgment (ACK) that corresponds to the downlink data packet.

9. The scheduled entity of claim 8, wherein the at least one processor is further configured to configure the PUSCH to be located in a first symbol of the uplink burst region and the PUCCH to be located in a second symbol of the uplink burst region.

10. The scheduled entity of claim 8, wherein the at least one processor is further configured to configure the PUCCH to be located in a first symbol of the uplink burst region and the PUSCH to be located in a second symbol of the uplink burst region.

11. The scheduled entity of claim 8, wherein the at least one processor is further configured to configure the PUSCH to be located in a same symbol as the UCI in the uplink burst region.

12. The scheduled entity of claim 8, wherein the at least one processor is further configured to configure the PUSCH to be located in a same symbol as the PUCCH in the uplink burst region, wherein the PUSCH is located across a first set of frequencies and the PUCCH is located across a second set of frequencies in the same symbol.

13. The scheduled entity of claim 8, wherein the at least one processor is further configured to configure the PUSCH to be located in a first symbol and a second symbol of the uplink burst region.

14. The scheduled entity of claim 8, wherein the at least one processor is further configured to receive a downlink grant comprising a grant of resources on which to receive information corresponding to the TCP ACK.

15. The scheduled entity of claim 8, wherein the at least one processor is further configured to:

determine one or more downlink resources for receiving the downlink data packet from the scheduling entity; and receive the downlink data packet from the scheduling entity via the one or more downlink resources.

16. The scheduled entity of claim 8, wherein the downlink data packet comprises a TCP data packet.

17. The scheduled entity of claim 16, wherein the downlink-centric slot comprises a self-contained slot.

18. A method operable at a scheduling entity for wireless communication, the method comprising:

transmitting a downlink data packet to a scheduled entity;

transmitting downlink control information (DCI) in a downlink-centric slot, the DCI indicating a configuration of an uplink burst region of the downlink-centric slot, the configuration determining a multiplexing arrangement of resources within the uplink burst region that multiplexes a physical uplink shared channel (PUSCH) with a physical uplink control channel (PUCCH) or uplink control information (UCI); and receiving, via the PUSCH corresponding to the uplink burst region of the downlink-centric slot a Transmission Control Protocol (TCP) acknowledgment (ACK) corresponding to the transmitted downlink data packet.

19. The method of claim 18, further comprising configuring the PUSCH to be located in a first symbol of the uplink burst region and the PUCCH to be located in a second symbol of the uplink burst region.

20. The method of claim 18, further comprising configuring the PUCCH to be located in a first symbol of the uplink burst region and the PUSCH to be located in a second symbol of the uplink burst region.

21. The method of claim 18, further comprising configuring the PUSCH to be located in a same symbol as the UCI in the uplink burst region.

22. The method of claim 18, further comprising configuring the PUSCH to be located in a same symbol as the PUCCH in the uplink burst region,
wherein the PUSCH is located across a first set of frequencies and the PUCCH is located across a second set of frequencies in the same symbol.

23. The method of claim 18, further comprising transmitting a downlink grant comprising a grant of resources on which to transmit information corresponding to the TCP ACK.

24. The method of claim 18, wherein the downlink data packet comprises a TCP data packet.

25. The method of claim 24, wherein the downlink-centric slot comprises:
at least one control channel comprising the PUCCH; and
at least one data channel comprising the PUSCH,
wherein the method further comprises:
receiving, via the at least one control channel, a hybrid automatic repeat request (HARQ) ACK in accordance with the DCI.

26. A scheduling entity for wireless communication, comprising:
at least one processor;
a transceiver communicatively coupled to the at least one processor; and
a memory communicatively coupled to the at least one processor, wherein the at least one processor is configured to:
transmit a downlink data packet to a scheduled entity;
transmit downlink control information (DCI) in a downlink-centric slot, the DCI indicating a configuration of an uplink burst region of the downlink-centric slot, the downlink-centric slot including more resources allocated for downlink transmissions than uplink transmissions, and the configuration determining a multiplexing arrangement of resources within the uplink burst region that multiplexes a physical uplink shared channel (PUSCH) with a physical uplink control channel (PUCCH) or uplink control information (UCI); and
receive, via the PUSCH configured in the uplink burst region of the downlink-centric slot, a Transmission Control Protocol (TCP) acknowledgment (ACK) corresponding to the transmitted downlink data packet.

27. The scheduling entity of claim 26, wherein the at least one processor is further configured to configure the PUSCH to be located in a first symbol of the uplink burst region and the PUCCH to be located in a second symbol of the uplink burst region.

28. The scheduling entity of claim 26, wherein the at least one processor is further configured to configure the PUCCH to be located in a first symbol of the uplink burst region and the PUSCH to be located in a second symbol of the uplink burst region.

29. The scheduling entity of claim 26, wherein the at least one processor is further configured to configure the PUSCH to be located in a same symbol as the UCI in the uplink burst region.

30. The scheduling entity of claim 26, wherein the at least one processor is further configured to configure the PUSCH to be located in a same symbol as the PUCCH in the uplink burst region,
wherein the PUSCH is located across a first set of frequencies and is configured to carry the TCP ACK via the first set of frequencies, wherein the PUCCH is located across a second set of frequencies in the same symbol.

31. The scheduling entity of claim 26, wherein the at least one processor is further configured to configure the PUSCH to be located in a first symbol and a second symbol of the uplink burst region.

32. The scheduling entity of claim 26, wherein the at least one processor is further configured to transmit a downlink grant comprising a grant of resources on which to transmit information corresponding to the TCP ACK.

33. The scheduling entity of claim 26, wherein the downlink data packet comprises a TCP data packet.

* * * * *